United States Patent [19]

Agrawal

[11] Patent Number: 4,747,705
[45] Date of Patent: May 31, 1988

[54] POWER SHAPED MULTIPAD HYDRODYNAMIC JOURNAL BEARING

[75] Inventor: Giridhari L. Agrawal, Simsbury, Conn.

[73] Assignee: United Technologies Corporation, Hartford, Conn.

[21] Appl. No.: 67,564

[22] Filed: Jun. 26, 1987

[51] Int. Cl.⁴ ............................................. F16C 17/02
[52] U.S. Cl. .................................. 384/118; 384/286; 384/450
[58] Field of Search ............... 384/118, 286, 450, 111, 384/117, 114, 398

[56] References Cited

U.S. PATENT DOCUMENTS

| | | | |
|---|---|---|---|
| 3,611,532 | 10/1971 | Dee | 384/111 |
| 4,302,060 | 11/1981 | Nicholas et al. | 384/111 |
| 4,311,349 | 1/1982 | Roberts | 384/286 |
| 4,671,676 | 6/1987 | Chen et al. | 384/118 |

Primary Examiner—Lenard A. Footland
Attorney, Agent, or Firm—Lloyd D. Doigan

[57] ABSTRACT

A fixed shape hydrodynamic journal bearing 10 is provided having a plurality of pads 18, each pad having a peak 22, a trough 20, and a curve 24 connecting the peak and the trough, the curve being defined by the equation: $h = r + s1 - \theta_1/\theta_2)^\alpha$.

4 Claims, 1 Drawing Sheet

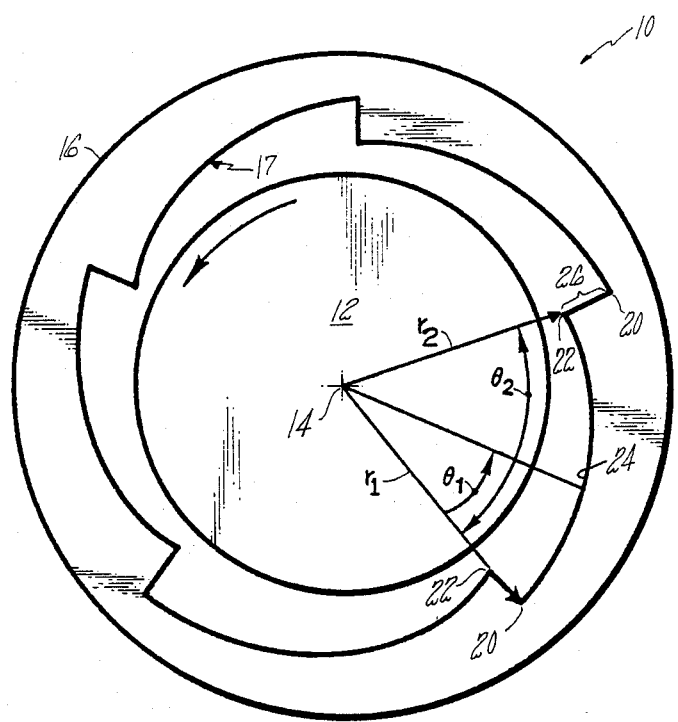

POWER SHAPED MULTIPAD HYDRODYNAMIC JOURNAL BEARING

DESCRIPTION

1. Technical Field

This invention relates to a specially shaped hydrodynamic journal bearing.

2. Background Art

High speed turbomachines require special journal bearings to support their rotating parts. Hydrodynamic bearings operate under the principle of hydrodynamic generation, wherein pressure is generated in the clearance between the bearing surface and the rotating part, such pressure producing a net load capacity and film stiffness. Hydrodynamic bearings are ideal for high speed applications because friction and lubrication requirements are minimized.

Variably shaped hydrodynamic bearings, such as foil bearings and tilting or pivoting pad bearings, have superior environmental, load, and stability characteristics yet are expensive and relatively difficult to manufacture.

Fixed shape bearings, such as axial groove, step, and multipocket bearings, while easier to construct lose stability at relatively low revolutions per minute and have relatively lower load capabilities.

Accordingly, new forms of hydrodynamic journal bearings are sought.

DISCLOSURE OF INVENTION

It is an object of the invention to provide a high speed journal bearing that is relatively inexpensive, has good stability and relatively high load capacity.

According to the invention, a hydrodynamic journal bearing has a plurality of pads, each pad having a peak, a trough, and a power curve connecting the peak and the trough, each curve being defined by the equation:

$$h = r + s(1 - \theta_1/\theta_2)^\alpha$$

where
- $h$ = distance of a point on the curve from the axis of the bearing
- $r$ = length of a radius $r_1$ emanating from an axis of the bearing and intersecting the peak of a pad
- $s$ = difference between the length of the radius $r_1$ and the length of a radius $r_2$ emanating from the axis and intersecting the trough of the pad
- $\theta_1$ = angular distance from the first radius to the point of the curve
- $\theta_2$ = angular distance from the first radius to the second radius
- $\alpha$ = power of the curve.

According to a feature of the invention the power of the curve is a number from four to six.

The foregoing, and other features and advantages of the present invention will become more apparent in light of the following detailed description and accompanying drawing.

BRIEF DESCRIPTION OF THE DRAWING

The FIGURE is a side view of the bearing of the invention. The curves portrayed have been exaggerated for ease of illustration.

BEST MODE FOR CARRYING OUT THE INVENTION

Referring to the drawing, an embodiment of a hydrodynamic journal bearing 10 for use in turbomachinery operating at 40,000 rpms or more, is shown. A rotor 12 which rotates in a counterclockwise direction is supported within the bearing. The bearing and the rotor have a common axis 14.

The bearing has a cylindrical outer surface 16 and a fixed shape inner surface 17. The inner surface is defined by a plurality of pads 18. Each pad has a trough 20, a peak 22 and a curve 24 connecting the trough and the peak. For a two inch bearing (that is, a circle (not shown), which intersects the peaks of the bearing, has a diameter of two inches) the clearance between the rotor and the peaks should approximate one-half of a millimeter. A step 26, which may lie along a radius $r_2$ connects the peak of a pad to the trough of an adjacent pad.

The points of each curve are defined by the equation:

$$h = r + s(1 - \theta_1/\theta_2)^\alpha$$

where
- $h$ = distance of a point on the curve from the axis of the bearing
- $r$ = length of a radius $r_1$ emanating from the axis of the bearing and intersecting a peak of a pad
- $s$ = difference between the length of the radius $r_1$ and the length of the radius $r_2$ emanating from the axis and intersecting a trough of the pad
- $\theta_1$ = angular distance from the first radius to the point of the curve
- $\theta_2$ = angular distance from the first radius to the second radius
- $\alpha$ = power of the curve.

It has been found that a power of the curve is a number from four to six. Such a power provides an ideal natural shape for developing pressure to support the rotating rotor 12. Similarly, a bearing having from 4-6 pads is ideal.

The bearing may be molded of a composite such as Vespel manufactured by Dupont or another suitable plastic. The bearing may also be machined from steel (or other suitable metal) and then polymer coated. The polymer coating prevents metal to metal contact when the bearing is not in use.

Such a bearing provides up to 200% more load capacity and up to eight times higher stability threshold speed than some fixed shape bearings and is far easier and less expensive to construct than a variable shaped bearing.

While the present invention has been illustrated and described with respect to a particularly preferred embodiment thereof, it will be appreciated by those skilled in the art, that various modifications to this system may be made without departing from the spirit and scope of the present invention.

I claim:

1. A hydrodynamic fixed shape journal bearing disposed about an axis characterized by:
    an outer surface, and
    an inner surface having a plurality of pads, each pad having a peak, a trough and a curved surface connecting said peak and trough, the points of the curved surface being defined by the equation:

$$h = r + s(1 - \theta_1/\theta_2)^\alpha$$

where h = distance of a point on the curve from the axis of the bearing r = length of a radius $r_1$ emanating from the axis of the bearing and intersecting a peak of a pad s = difference between the length of the radius $r_1$ and the length of a radius $r_2$ emanating from the axis and intersecting a trough of the pad $\theta_1$ = angular distance from the first radius to the point of the curve $\theta_2$ = angular distance from the first radius to the second radius $\alpha$ = power of the curve.

2. The bearing of claim 1 wherein
$\alpha$ = a number from 4 to 6.

3. The bearing of claim 1 wherein a peak of each pad and a trough of an adjacent pad intersect said radius $r_2$ emanating from said axis.

4. The bearing of claim 1 wherein said bearing has from 4 to 6 pads.

* * * * *